(12) United States Patent
Liu et al.

(10) Patent No.: US 12,117,783 B2
(45) Date of Patent: Oct. 15, 2024

(54) ONLINE FREQUENTLY DERIVED MEASUREMENTS FOR PROCESS MONITORING, CONTROL AND OPTIMIZATION

(71) Applicant: ABB Schweiz AG, Baden (CH)

(72) Inventors: ChangYuan Liu, Powell, OH (US); Donald Ray Stanley, III, Powell, OH (US); Andrew Daniel Steiger, Columbus, OH (US)

(73) Assignee: ABB Schweiz AG, Baden (CH)

( * ) Notice: Subject to any disclaimer, the term of this patent is extended or adjusted under 35 U.S.C. 154(b) by 644 days.

(21) Appl. No.: 17/071,377

(22) Filed: Oct. 15, 2020

(65) Prior Publication Data
US 2022/0121162 A1    Apr. 21, 2022

(51) Int. Cl.
| | | |
|---|---|---|
| *G05B 13/04* | (2006.01) | |
| *G05B 13/02* | (2006.01) | |
| *G06Q 10/0637* | (2023.01) | |
| *G06Q 10/0639* | (2023.01) | |
| *G06Q 10/067* | (2023.01) | |
| *G06Q 10/10* | (2023.01) | |
| *G06Q 30/0201* | (2023.01) | |
| *G06Q 50/04* | (2012.01) | |

(52) U.S. Cl.
CPC ......... *G05B 13/048* (2013.01); *G05B 13/027* (2013.01); *G06Q 10/0637* (2013.01); *G06Q 10/06393* (2013.01); *G06Q 10/06395* (2013.01); *G06Q 10/067* (2013.01); *G06Q 10/103* (2013.01); *G06Q 30/0201* (2013.01); *G06Q 50/04* (2013.01)

(58) Field of Classification Search
CPC .. G05B 13/048; G05B 13/027; G05B 23/024; G05B 19/4183; G05B 2219/37542; G06Q 10/0637; G06Q 10/06393; G06Q 10/06395; G06Q 10/067; G06Q 10/103; G06Q 30/0201; G06Q 50/04; Y02P 80/40; Y02P 90/02
See application file for complete search history.

(56) References Cited

U.S. PATENT DOCUMENTS

| | | |
|---|---|---|
| 7,437,208 B2 | 10/2008 | Muench et al. |
| 8,594,828 B2 | 11/2013 | Stephenson et al. |
| 9,116,516 B2 | 8/2015 | Mullin |
| (Continued) | | |

FOREIGN PATENT DOCUMENTS

| | | |
|---|---|---|
| CN | 109668588 A | 4/2019 |
| EP | 1880258 | 1/2008 |

OTHER PUBLICATIONS

Strength Virtual Measurement for paper, packaging and tissue; https://new.abb.com/pulp-paper/abb-in-pulp-and-paper/service/advanced-services/performance-services-for-paper-mills/strength-virtual-measurement; 4 pages; ABB Inc.; 2020.

(Continued)

*Primary Examiner* — Santosh R Poudel
(74) *Attorney, Agent, or Firm* — Leydig, Voit & Mayer, Ltd.

(57) ABSTRACT

A system, method, and/or apparatus is provided for production processes in which online frequently derived measurements are determined use existing online and/or offline reference measurements and real-time and/or historical data to model process variables and/or product properties to achieve enhanced production goals.

22 Claims, 4 Drawing Sheets

(56) References Cited

U.S. PATENT DOCUMENTS

| | | | |
|---|---|---|---|
| 2002/0103745 A1* | 8/2002 | Lof | H02J 3/008 |
| | | | 705/37 |
| 2006/0218107 A1* | 9/2006 | Young | G05B 13/027 |
| | | | 706/13 |
| 2010/0082120 A1 | 4/2010 | Stephenson et al. | |
| 2020/0109700 A1* | 4/2020 | Shen | G01K 7/16 |

OTHER PUBLICATIONS

New ABB Strength Virtual Measurement enables mills to optimize quality with accurate, online strength prediction; 3 pages; ABB Inc. Press Release; Jun. 23, 2020.

Strength Virtual Measurement datasheet; 2 pages; ABB Inc. Press Release; Jun. 19, 2020.

European Patent Office, International Search Report in International Patent Application No. PCT/IB2021/059520, 4 pp. (Jan. 18, 2022).

European Patent Office, Written Opinion in International Patent Application No. PCT/IB2021/059520, 7 pp. (Jan. 18, 2022).

* cited by examiner

ONLINE FREQUENTLY DERIVED MEASUREMENTS FOR PROCESS MONITORING, CONTROL AND OPTIMIZATION

BACKGROUND

The present disclosure relates in general to production process controls, and, more particularly, to improving production processes by utilizing frequently derived online measurements for process variables and/or product properties to achieve desired production goals via improved monitoring, control, and/or optimization of production processes.

There are typically multiple process variables and/or product properties that have no online physical measurements, are infrequently measured, or have missing measurements due to abnormal process conditions or out-of-service physical sensors. As a result, a process may be operated blindly, or properties of the manufactured products produced during the process may unknowingly fail to meet required specifications for prolonged periods of time.

Many parameters of an industrial process may be modeled with physical principles, such as mass balance, energy balance, heat transfer, etc. Prior art techniques do not allow models to be created as a combination of physical principles and statistical regressions or models of the data. In addition, prior art process control techniques may focus on product quality parameters, but are not applied to or are applicable to a wide variety of process control parameters. As a result, there is a need for production process control techniques that allow the combination of physical principles, statistical regressions, and artificial intelligence/machine learning capability to model process characteristics for producing desirable online derived measurements. The present disclosure is directed to a system, method, and/or apparatus to achieve these ends, among others.

SUMMARY

In accordance with the present disclosure, a system, method, and/or apparatus is provided for production processes to generate online frequently derived measurements by using existing online and/or offline measurements to model process variables and/or product properties. The online derived measurements are updated regularly and frequently, and can be used for online monitoring, control, and/or optimization of production processes and can be employed to achieve production goals and production improvements. The online derived measurements may be applied, for example, for process and/or product measurements that are not available with an online physical sensor, for process and/or product measurements that are available at an undesired frequency or with an undesired delay, to provide stand-in readings for a physical sensor that is not measuring or is not available, and/or to cross-check or validate measurements from a physical sensor. Also provided in accordance with the present disclosure is a computer system that is operable to perform the foregoing.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
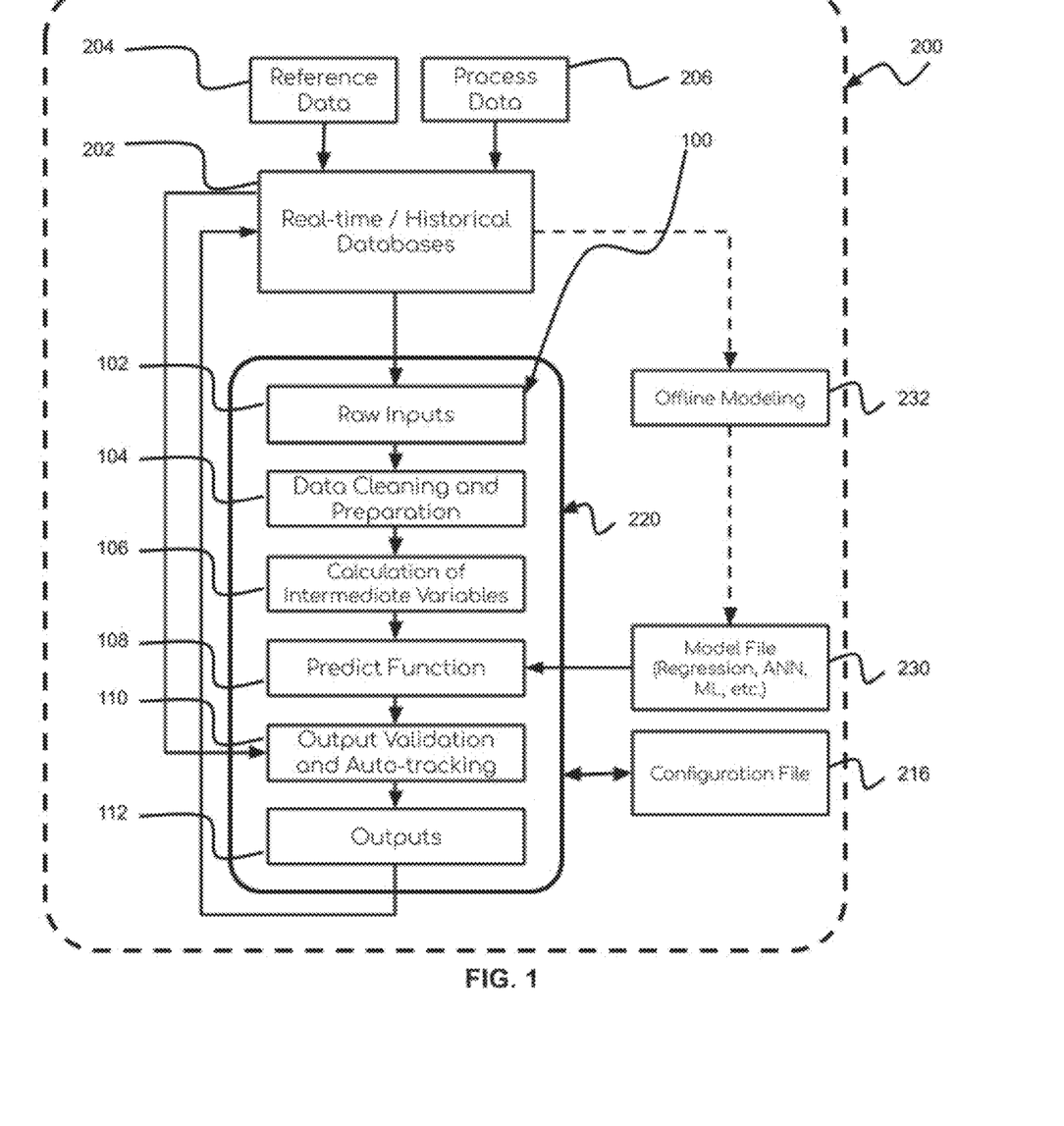
FIG. 1 shows a schematic view of an exemplary system and procedure for determining online frequently derived measurements for a production process.
Figure 2:
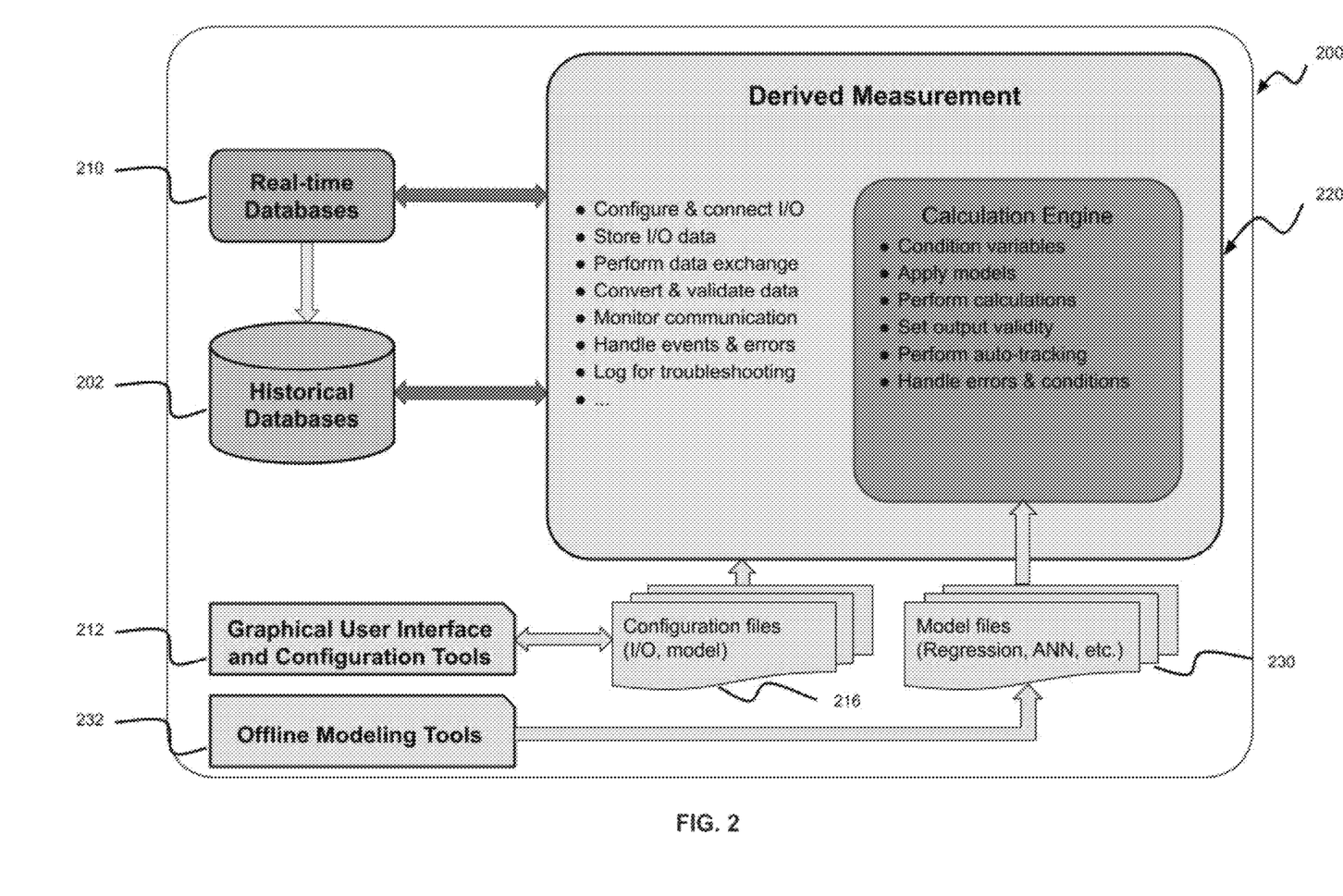
FIG. 2 shows is a schematic of an exemplary control architecture for determining online frequently derived measurements of the production process.

Referring to FIGS. 1-2, there is shown a procedure 100 executable by a computer system 200 for creating online frequently derived measurements for an industrial production process. The computer system 200 may include at least one computer processor 220 that outputs frequently derived measurements associated with the production process. In one embodiment, the industrial production process is a papermaking process; however other production processes are also contemplated such as paper and pulp processing, chemical refining and processing, metal refining and processing, oil and/or gas refining and processing, food production, and production of plastics, textiles, etc.

The computer processor 220 receives inputs from real-time and/or historical databases 202 of computer system 200. The inputs may include real-time and/or historical reference data 204, and real-time and/or historical process data 206. Real-time and/or historical reference data 204 may include process variables and/or product properties that are associated directly or indirectly with a desired derived measurement of a process variable and/or property of the product to be produced by the process. The process variable may be, for example, a Kappa number, causticizer efficiency of pulping processes, just name a few. The product property may be, for example, a dimension, weight, strength, moisture, durability, elasticity, viscosity, quality, raw material usage, and constituent amount and/or content, just to name a few. Real-time and/or historical process data 206 may include one or more process variables or parameters that are associated directly or indirectly with the desired derived measurement of the process used to produce the product. The process variables may be, for example, a temperature, pressure, moisture, constituent content, dimension, weight, machine speed, moisture content, viscosity, elasticity, strength, raw material usage, rejects, or any key performance indicator, to name a few. The real-time and/or historical reference data 204 and real-time and/or historical process data 206 may be obtained from one or more sources, such as from current and/or previous modelling of the process and/or product, testing of the process and/or product, and from current and/or previous runs of the product and/or production process, to name a few.

The computer processor 220 sends outputs to one or more real-time and/or historical databases 202 of computer system 200. The real-time databases may refer to, for example, open platform communication (OPC) server(s) of computer system 200. OPC server(s) may be associated with the production process to collect real-time data and other information regarding the production process and/or to receive data from computer processor 220. In one embodiment, the computer processor 220 and the real-time and/or historical databases 202 are remote from one another and are connected via a communication interface to allow the exchange of data therebetween. Real-time and/or historical databases 202 may use and/or communicate the output from computer processor 220 in order to, for example, monitor, control, and/or optimize the process using the online frequently derived measurements determined according to procedure 100.

The computer processor 220 sends outputs to one or more real-time and/or historical databases 202 of computer system 200 at a higher frequency, for example, every five seconds, than the online or offline reference measurements, for example, every hour. The computer processor 220 sends outputs periodically to one or more real-time and/or historical databases 202 of computer system 200 when the online or offline reference measurements are not available temporarily.

The computer system 200 may further include one or more other computer processors, servers, and databases for performing off-line tasks related to the production process and/or the procedure 100. At least one of the computers of the computer system 200, such as computer processor 220, has access to graphical user interface devices and configuration tools 212 that include one or more display devices, such as a monitor (with or without a touch screen) or a hand-held device such as a smart phone, tablet, laptop computer, or other front end device for displaying graphics, and one or more input devices, such as a keyboard, a mouse, a track ball, a joystick, a hand-held device, and/or voice-activated device.

The computer system 200 also includes a server for configuration files 216 in operative communication with computer processor 220. Configuration files 216 may be updated and maintained via graphical user interface and configuration tools 212. Configuration files may assign the various inputs and outputs to computer processor 220, the models employed by computer processor 220, and other aspects of computer processor 220. The configuration files 216 may also specify parameters for computer processor 220 related to the buffer history from real-time databases, such as OPC server(s), performing data exchange, converting and validating data, monitoring communication, handling events and errors, and logging for troubleshooting, to name a few examples.

Computer system 200 also includes a server for model files 230 in operative communication with computer processor 220. The model files 230 may include model structures such as linear and/or non-linear models. Linear models may include, for example, statistical regression algorithms, performed by offline modeling 232 using historical data from real-time and/or historical databases 202. Non-linear model results may be obtained from offline modeling 232 using non-linear models such as, for example, artificial intelligence (AI) and/or machine learning (ML) models. Process modeling incorporates historical data from real-time and/or historical databases 202 into the analysis using various artificial intelligence techniques, such as fuzzy logic, Bayes belief propagation networks, neural networks and/or genetic algorithm tools, and the like. The AI/ML models may utilize multiple learning mechanisms (such as supervised, unsupervised and reinforcement learning) as well as multiple types of algorithms (linear, non-linear, combined) for example: Artificial Neural Networks, Random Forest, Support Vector Machines, Gradient Boosting Machine and derivatives including but not limited to Extreme Gradient Boosting Machine, Classification and Regression Trees, and Logistic Regression.

Referring further to FIG. 1, computer processor 220 is configured to perform an operation 102 to receive raw data inputs from real-time and/or historical database 202. At operation 104, computer processor 220 performs data cleaning and preparation. Operation 104 may include, for example, data synchronization, removal of outliers and/or exceptions from the raw data inputs, and filtering to condition the raw data for use in creating derived measurements.

At operation 106 the computer processor 220 calculates intermediate variables from the conditioned raw data inputs of operation 104. Operation 106 may include combining utilizing one or more process variables from process data 206 and/or utilizing one or more product properties from reference data 204 into one or more intermediate variables. The intermediate variables may simplify subsequent model structures and/or improve the model accuracies. The process and/or product variables may be combined based on physical principles or well-known relationships among the process variables and/or product properties, depending on known physical principles between the variables and the measurement to be derived. Operation 106 additionally may include normalizing the intermediate variables to the relatively similar numerical range, such as removing statistical means and scaling with standard deviation or peak-to-peak value of the variables.

At operation 108, the computer processor 220 is used to perform a predict function for the online frequently derived measurements. Operation 108 may include obtaining reference measurements, either online or offline, for the production process and/or product properties. The reference measurements are typically measured infrequently, or periodically become not available during the production process due to various reasons, such as physical sensor inoperability or unavailability. The predict function can be, for example, a mathematical relationship between the intermediate variables and the reference measurements expressed linearly or non-linearly with one or more of the structures obtained from the model files 230. The predict function at operation 108 determines the derived measurements for the process variables and/or product properties using the models 230 based on the intermediate variables and the process variables and/or product properties.

At operation 110, output auto-tracking and validation is performed by computer processor 220 for the derived measurements from operation 108. The derived measurements from operation 108 can be made to track the reference measurements whenever valid reference measurements are updated. The online derived measurements may be determined at a frequency that varies depending on the need for the machinery or process being measured. At operation 112 the validated online frequently derived measurements are outputted to the real-time and/or historical databases 202 or other computer system/UI for monitoring, control and/or optimization of the production process. The auto-tracking functionality uses a regression function and/or a recursive method to determine and correct the relationship between the derived measurements from operation 108 and the reference measurements 204, such as using calculated slope and offset values.

Figure 3:
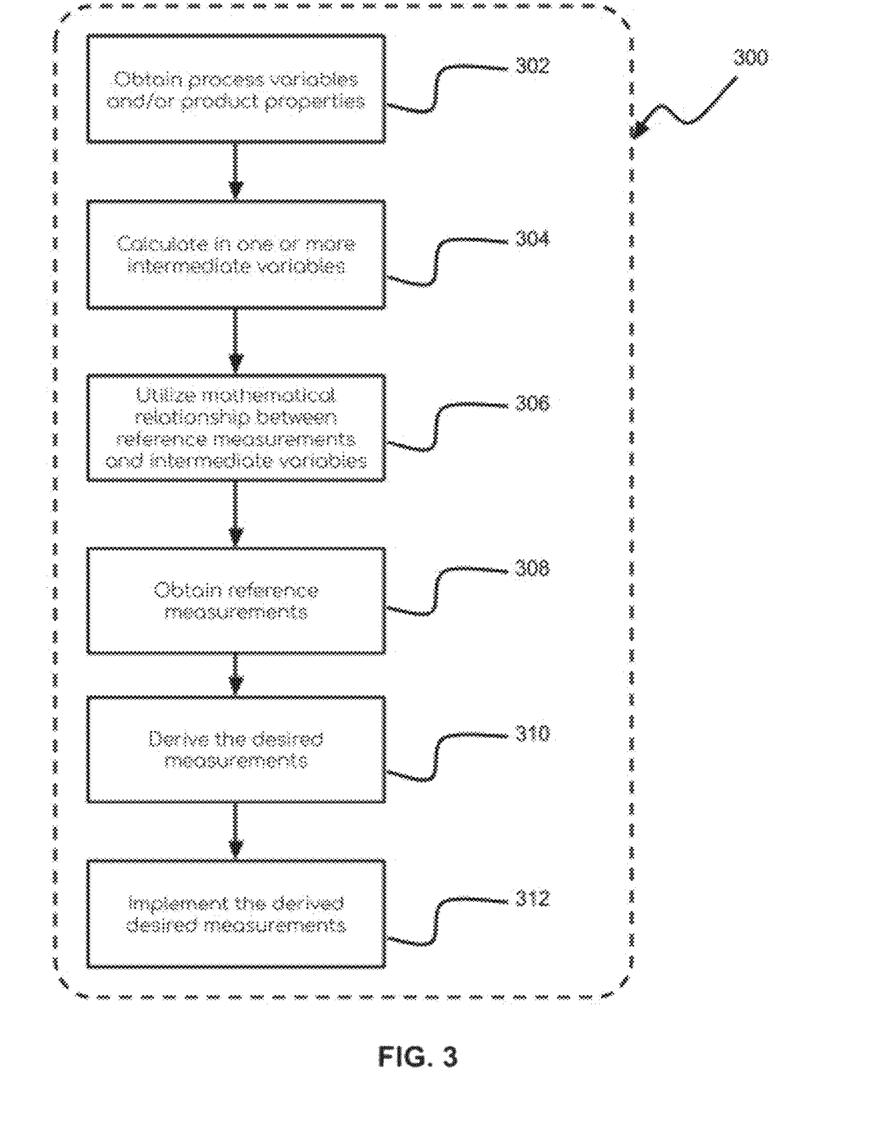
FIG. 3 is a flow diagram of a method for determining online frequently derived measurements in a production process.

Referring to FIG. 3, there is shown a method 300 for deriving online measurements in a production process in accordance with procedure 100 and computer system 200 discussed above. Method 300 includes an operation 302 to obtain a plurality of process variables and/or product properties associated with a desired measurement to be derived, such as from real-time and/or historical databases 202.

Method 300 continues at operation 304 to calculate one or more intermediate variables based on the plurality of process variables and/or product properties. The plurality of process variables and/or product properties may be conditioned, as discussed above, before determining the one or more intermediate variables. The intermediate variables may be determined by, for example, utilizing one or more of the conditioned process variables and/or product properties.

Method 300 continues at operation 306 to utilize a mathematical relationship that is determined between the one or more reference measurements and the one or more intermediate variables. At operation 308 one or more reference measurements associated with the one or more intermediate variables are obtained. The one or more reference measurements can be obtained offline and/or online from the production process.

Method 300 continues at operation 310 to derive the desired measurements based on the mathematical relationship and a plurality of updated process variables and/or product properties. As discussed above, the mathematical relationship can be based on linear and/or non-linear models. In addition, one or more of the derived measurements can be validated and/or forced to track reference measurements that are determined to be valid. At operation 312, the frequently derived online measurements are implemented with respect to the production process. For example, the frequently derived online measurements can be provided to another computer system that controls the production process and/or to a user interface.

The present disclosure allows various process variables and/or product properties to be combined to derive intermediate variables before other mathematical relationships, such as those based on linear and non-linear modelling algorithms, are applied. The present disclosure also allows the most up-to-date reference measurements to be used to update both the mathematical relationships and the latest derived measurements so that the online derived measurements will track the reference measurements closely.

As a result, the present disclosure allows a combination of physical principles and regression/machine learning techniques to obtain online frequently derived measurements for production process control. The present disclosure contemplates that parts of the production process are modeled with physical principles/measurements and other parts are modeled statistically. This combination provides maximum flexibility for users to capture a wide range of relationships among various process variables and/or product properties, providing actionable data more quickly and the ability to predictively monitor the production process. Such relationships can then be effectively used to derive online measurements precisely and reliably. For example, deviations from specification limits can be identified more quickly and the production process adapted accordingly, saving raw material and input costs. Out-of-specification product can be identified and remedied to provide more consistent quality and reduce waste by implementing corrective actions quicker than previously possible.

The present disclosure can be applied in industrial production processes and will allow those production processes to be closely monitored, controlled, and optimized. As a result, process uptime improvement, reduction of raw material usage, better process control, and more optimized operation can be consistently achieved along with significant cost savings. Online frequently derived measurements for process control can be applied in various manners. For example, by way of illustration and not limitation, applications may include paper and pulp processing, chemical refining and processing, metal refining and processing, oil and/or gas refining and processing, food production, plastics, textiles, etc.

One specific application includes providing online frequently derived measurements for sheet strength in paper and pulp processing. Sheet strength measurements are usually obtained in the laboratory through destructive tests on small samples. Due to the nature of destructive tests, it is extremely difficult to build an equivalent online measurement while a paper sheet is made. As such, online frequently derived measurements of sheet strength properties can be obtained implementing the present disclosure without resorting to destructive testing.

Another application includes providing online frequently derived measurements for weight, moisture, caliper, and other physical properties, such as those used in paper and pulp processing or the other processing applications described herein. Typical production processes employ physical sensors to measure various product properties. These types of sensors usually are installed at the end or near the end of the production processes. When these sensors are in normal operation, they often provide accurate sheet property measurements. However, during machine startup, breaks in product or production, and/or periods where sensors are out-of-service, these physical sensors will not be able to provide highly needed product quality measurements. The online frequently derived measurements for these product properties can effectively stand in for the measurements that are unavailable for the physical sensors and can be employed for process monitoring, control, and/or optimization. Therefore, the present disclosure can employed to maintain the process control, recover from product or production breaks, or shorten transitions of operation.

Another application includes providing online frequently derived measurements for pulp digester cooking zone derived kappa measurements. Since pulp digestion is a slow process, there is often a lack of reliable and repeatable kappa measurements for digester process control and optimization. The online frequently derived measurements for the kappa number will allow the digester process to be better controlled and significantly more consistent, resulting in more uniform pulp quality, and providing valuable improvements in the downstream operations.

Another application includes providing online frequently derived measurements for causticizing efficiency measurements. Physical online causticizer efficiency measurements are extremely noisy and unreliable. Online frequently derived measurements for causticizer efficiency can provide much-needed frequency and precision regarding chemical reactions and process efficiency. With the online frequently derived measurements of the present disclosure used to measure causticizer efficiency, the control utilization and process uptime can be significantly improved.

The schematic diagrams and procedures described above are generally set forth herein. As such, the depicted order and labeled steps are indicative of representative embodiments. Other steps, orderings, combinations of steps, and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the systems, apparatus, and methods illustrated by the diagrams. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 4:
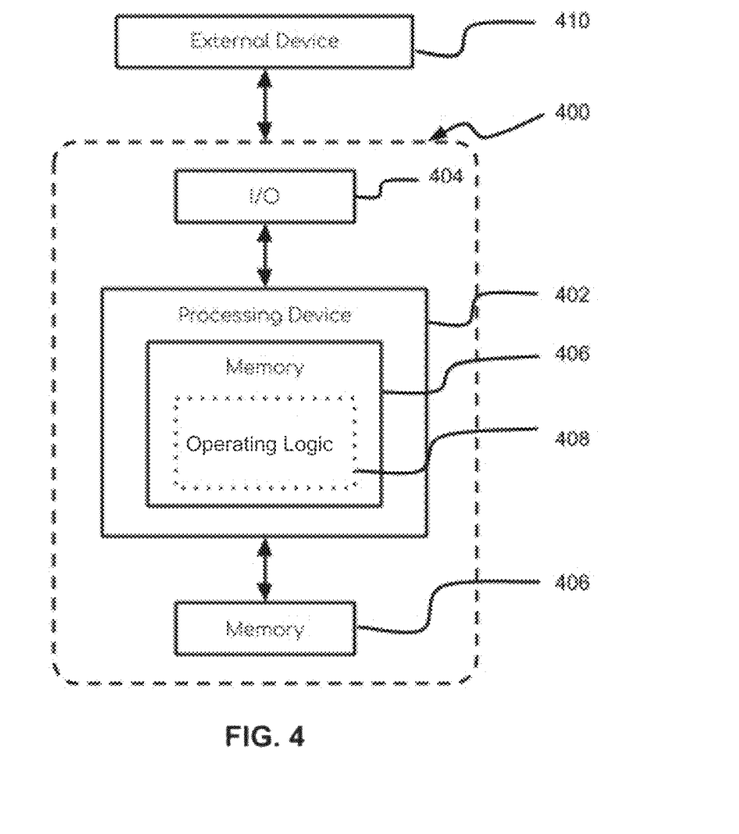
FIG. 4 is a block diagram illustrating an exemplary computer processor for determining online frequently derived measurements in a production process.

Many of the functional units described in this specification have been labeled in order to more particularly emphasize the possibility of implementation independence. For example, one or more aspects of computer system 200, such as computer processor 220 or the databases and/or servers in communication therewith, may be implemented in whole or in part as shown in FIG. 4, designated as processing system 400. Processing system 400 can be implemented as a hardware circuit comprising custom VLSI circuits or gate arrays, off-the-shelf semiconductors such as logic chips, transistors, or other discrete components. Processing system 400 may also be implemented in programmable hardware devices such as field programmable gate arrays, programmable array logic, programmable logic devices or the like.

With reference to FIG. 4, processing system 400 includes a processing device 402, an input/output device 404, memory device 406, and operating logic 408. Furthermore, the processing system 400 communicates with one or more external devices 410, including other databases, servers, or computer processing systems discussed herein with respect to FIGS. 1-2. Processing system 400 may be a stand-alone device, an embedded system, or a plurality of devices structured to perform the functions described with respect to the systems described herein.

Input/output device 404 enables processing system 400 to communicate with local field devices or other agents or control systems. Input/output device 404 may include a network adapter, interface, or a port (e.g., a USB port, serial port, parallel port, an analog port, a digital port, VGA, DVI, HDMI, FireWire, CAT 5, Ethernet, fiber, or any other type of communication port or interface), to name but a few examples. Input/output device 404 may include more than one of these adapters, interfaces, or ports, such as a first port for receiving data and a second port for transmitting data.

Processing device 402 may include one or multiple processors, Arithmetic-Logic Units (ALUs), Central Processing Units (CPUs), Digital Signal Processors (DSPs), or Field-programmable Gate Arrays (FPGAs), to name but a few examples. For forms of processing devices with multiple processing units, distributed, pipelined, or parallel processing may be used. Processing device 402 may be dedicated to performance of only the operations described herein or may be used in one or more additional applications. Processing device 402 may be of a programmable variety that executes algorithms and processes data in accordance with operating logic 408 as defined by programming instructions (such as software or firmware) stored in memory 406. Alternatively or additionally, operating logic 408 for processing device 402 is at least partially defined by hardwired logic or other hardware. Processing device 402 may comprise one or more components of any type suitable to process the signals received from input/output device 404 or elsewhere, and provide desired output signals. Such components may include digital circuitry, analog circuitry, or a combination of both.

Memory device 406, also known as a computer readable medium, may be of one or more types of memory, such as a solid-state variety, electromagnetic variety, optical variety, or a combination of these forms, to name but a few examples. Furthermore, memory device 406 may be volatile, nonvolatile, transitory, non-transitory or a combination of these types, and some or all of memory device 406 may be of a portable variety, such as a disk, tape, memory stick, or cartridge, to name but a few examples. In addition, memory device 406 may store data that is manipulated by operating logic 408 of processing device 402, such as data representative of signals received from and/or sent to input/output device 404 in addition to or in lieu of storing programming instructions defining operating logic 408, just to name one example. Memory device 406 may be included with processing device 402 and/or coupled to processing device 402.

One or more aspects of processing system 400 may also be implemented in machine-readable medium for execution by various types of processors. In some instances, the machine-readable medium for execution by various types of processors may be implemented in the aforementioned hardware circuit. An identified module of executable code may, for instance, comprise one or more physical or logical blocks of computer instructions, which may, for instance, be organized as an object, procedure, or function. Nevertheless, the executables of an identified circuit need not be physically located together, but may be comprised of disparate instructions stored in different locations which, when joined logically together, comprise the circuit and achieve the stated purpose for the processing system 400.

For example, computer readable program code may be a single instruction, or many instructions, and may even be distributed over several different code segments, among different programs, and across several memory devices. Similarly, operational data may be identified and illustrated herein within a module, monitor, or circuit, and may be embodied in any suitable form and organized within any suitable type of data structure. The operational data may be collected as a single data set, or may be distributed over different locations including over different storage devices, and may exist, at least partially, merely as electronic signals on a system or network. Where a module, monitor, or circuit or portions thereof are implemented in machine-readable medium (or computer-readable medium), the computer readable program code may be stored and/or propagated on one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more programming languages, including an object oriented programming language such as Java, Smalltalk, C++, C#, or the like and conventional procedural programming languages, such as the "C" programming language, Python, Matlab, R, or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a controller, computer, other programmable data processing apparatus, or other devices to function in a particular manner, such that the instructions stored in the computer readable medium produce an article of manufacture including instructions which implement the function/act specified herein.

Various aspects and embodiments of the present disclosure are contemplated. One or more these aspects and/or embodiments may be combined with one or more other of the aspects and/or embodiments.

For example, according to one aspect, a method of frequently deriving online measurements associated with a production process for a product is disclosed. The method includes obtaining a plurality of process variables associated with the production process and/or product properties associated with the product; determining one or more intermediate variables based on the plurality of process variables and/or product properties; obtaining one or more reference measurements from the production process and/or the product that are associated with the one or more intermediate variables; modelling a relationship between the one or more reference measurements and the one or more intermediate variables; repeatedly deriving the online measurements based on the modelled relationship and the reference measurements; and implementing the derived online measurements with respect to the production process.

In an embodiment, the plurality of process variables and/or product properties are obtained from real-time and/or historical databases that include current and/or historical process data for the production process and real-time and/or historical reference data for the product. In an embodiment, the method includes conditioning the plurality of process variables and/or product properties before determining the one or more intermediate variables.

In an embodiment, determining one or more intermediate variables includes utilizing one or more of the plurality of process variables. In an embodiment, determining one or more intermediate variables includes normalizing the one or more intermediate variables. In an embodiment, the one or more reference measurements are either online or offline during the production process. In an embodiment, determining one or more intermediate variables includes utilizing one or more of the plurality of process variables based on physical principles.

In an embodiment, the modelled relationship is a non-linear relationship. In an embodiment, the non-linear relationship is determined by an artificial neural network and/or a machine learning algorithm.

In an embodiment, the modelled relationship is a linear relationship. In an embodiment, the linear relationship is determined by a statistical regression analysis.

In an embodiment, the method includes determining at least one of the one or more reference measurements is valid; and auto-tracking at least one of the derived online measurements to the at least one valid reference measurement. In an embodiment, the method includes providing the derived online measurements to at least one of a computer system that controls the production process and a user interface.

According to another aspect, a computer system is configured to frequently derive online measurements associated with a production process for a product. The computer system includes at least one computer processor that operates during the production process. The at least one computer processor operates to: obtain a plurality of process variables associated with the production process and/or a plurality of product properties associated with the product; determine one or more intermediate variables based on the plurality of process variables and/or the plurality of product properties; obtain one or more reference measurements from the production process and/or the product that are associated with the one or more intermediate variables; model a relationship between the one or more reference measurements and the one or more intermediate variables; repeatedly derive online measurements based on the modelled relationship and the one or more reference measurements; and implement the derived online measurements with respect to the production process.

In an embodiment, the at least one computer processor is operable to condition the plurality of process variables and/or the plurality of product properties before the one or more intermediate variables are determined. In an embodiment, the at least one computer processor is operable to utilize one or more of the plurality of process variables to determine the one or more intermediate variables. In an embodiment, the at least one computer processor is operable to utilize one or more of the plurality of process variables based on physical principles to determine the one or more intermediate variables In an embodiment, the model is a non-linear relationship determined by an artificial neural network and/or a machine learning algorithm. In an embodiment, the model is a linear relationship determined by a statistical regression analysis. In an embodiment, the at least one computer processor is operable to normalize the one or more intermediate variables In an embodiment, the at least one computer processor is operable to determine at least one of the one or more reference measurements is valid and track at least one of the derived online measurements to the one or more valid reference measurements.

In an embodiment, the computer system includes databases with real-time and/or historical reference data for the product properties and real-time and/or historical process data for the process variables. The databases are in operative communication with the at least one processor to exchange the real-time and/or historical reference data and the historical process data therebetween. In an embodiment, the real-time databases, such as open platform communication (OPC) servers, and/or historical databases are in operative communication with the at least one processor to exchange the derived online measurements therebetween. In an embodiment, a graphical user interface is in operative communication with the at least one processor.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of frequently deriving online measurements associated with a production process for a product, the method comprising:
    obtaining a plurality of process variables associated with the production process and product properties associated with the product;
    determining a plurality of intermediate variables based on the plurality of process variables and/or product properties;
    obtaining one or more reference measurements from the production process and/or the product that are associated with the plurality of intermediate variables, wherein each of the plurality of intermediate variables are determined by combining one or more process variables from process data and one or more properties of the product from the one or more reference measurements;
    modelling a relationship between the one or more reference measurements and the plurality of intermediate variables;
    repeatedly deriving the online measurements based on the modelled relationship;
    controlling the production process using the derived online measurements;
    determining at least one of the one or more reference measurements is valid; and
    auto-tracking at least one of the derived online measurements to the at least one valid reference measurement, wherein the auto-tracking is performed using a regression function to determine and correct a relationship between the derived online measurements to the at least one valid reference measurement.

2. The method of claim 1, wherein the plurality of process variables and/or product properties are obtained from a database that includes current and/or historical process data for the production process and/or reference data for the product.

3. The method of claim 2, further comprising conditioning the plurality of process variables and/or product properties before determining the plurality of intermediate variables.

4. The method of claim 1, wherein determining the plurality of intermediate variables includes utilizing one or more of the plurality of process variables based on physical principles.

5. The method of claim 1, wherein the one or more reference measurements are either online or offline during the production process.

6. The method of claim 1, wherein the modelled relationship is a non-linear relationship.

7. The method of claim 6, wherein the non-linear relationship is determined by an artificial neural network and/or a machine learning algorithm.

8. The method of claim 1, wherein the modelled relationship is a linear relationship.

9. The method of claim 8, wherein the linear relationship is determined by a statistical regression analysis.

10. The method of claim 1, wherein determining the plurality of intermediate variables includes normalizing the plurality of intermediate variables.

11. The method of claim 1, wherein implementing the derived online measurements with respect to the production comprises outputting the derived online measurements to real-time and/or historical databases or other computer system/UI for monitoring, control and/or optimization of the production process.

12. The method of claim 1, wherein the derived online measurements are repeatedly derived at a frequency that varies depending on the need for the machinery or process being measured.

13. A computer system configured to frequently derive online measurements associated with a production process for a product, the computer system including at least one hardware computer processor that operates during the production process to:
   obtain a plurality of process variables associated with the production process and a plurality of product properties associated with the product;
   determine a plurality of intermediate variables based on the plurality of process variables and/or the plurality of product properties;
   obtain one or more reference measurements from the production process and/or the product that are associated with the plurality of intermediate variables, wherein each of the plurality of intermediate variables are determined by combining one or more process variables from process data and one or more properties of the product from the one or more reference measurements;
   model a relationship between the one or more reference measurements and the plurality of intermediate variables;
   repeatedly derive online measurements based on the modelled relationship;
   controlling the production process using the derived online measurements;
   determine at least one of the one or more reference measurements is valid; and
   auto-track at least one of the derived online measurements to the one or more valid reference measurements, wherein the auto-tracking is performed using a regression function to determine and correct a relationship between the derived online measurements to the at least one valid reference measurement.

14. The computer system of claim 13, wherein the at least one hardware computer processor is operable to condition the plurality of process variables and/or the plurality of product properties before the plurality of intermediate variables are determined.

15. The computer system of claim 13, wherein the at least one hardware computer processor is operable to utilize one or more of the plurality of process variables to determine the plurality of intermediate variables.

16. The computer system of claim 13, wherein the at least one hardware computer processor is operable to utilize one or more of the plurality of process variables based on physical principles to determine the plurality of intermediate variables.

17. The computer system of claim 13, wherein the model is a non-linear relationship determined by an artificial neural network and/or a machine learning algorithm.

18. The computer system of claim 13, wherein the model is a linear relationship determined by a statistical regression analysis.

19. The computer system of claim 13, further comprising:
   a database for storing historical reference data for the product properties and historical process data for the process variables, the database in operative communication with the at least one processor to exchange the historical reference data and the historical process data therebetween.

20. The computer system of claim 19, further comprising:
   an open platform communication server in operative communication with the at least one processor and with the historical database to exchange the derived online measurements therebetween.

21. The computer system of claim 19, further comprising a graphical user interface in operative communication with the at least one processor.

22. The computer system of claim 13, wherein the at least one hardware computer processor is operable to normalize the plurality of intermediate variables.

* * * * *